United States Patent [19]
Bryne

[11] Patent Number: 5,213,009
[45] Date of Patent: May 25, 1993

[54] CLEAT FOR CLIPLESS PEDALS

[76] Inventor: Richard M. Bryne, 2172 Pine St., San Diego, Calif. 92103

[21] Appl. No.: 793,148

[22] Filed: Nov. 18, 1991

[51] Int. Cl.⁵ .......................... G05G 1/14; A43B 5/00
[52] U.S. Cl. .................................. 74/594.6; 74/594.4
[58] Field of Search ...................... 74/594.4, 594.6, 560

[56] References Cited

U.S. PATENT DOCUMENTS

| | | | |
|---|---|---|---|
| 4,864,887 | 9/1989 | Rapisarda | 74/594.4 X |
| 4,898,063 | 2/1990 | Sampson | 74/594.6 |
| 4,899,618 | 2/1990 | Christol | 74/594.6 |
| 4,942,778 | 7/1990 | Bryne | 74/594.4 X |
| 5,003,841 | 4/1991 | Nagano | 74/594.6 X |
| 5,048,369 | 9/1991 | Chen | 74/594.6 |
| 5,131,291 | 7/1992 | Beyl | 74/594.4 X |
| 5,142,938 | 9/1992 | Sampson | 74/594.4 X |

FOREIGN PATENT DOCUMENTS

| | | | |
|---|---|---|---|
| 2645826 | 10/1990 | France | 74/594.6 |
| 2209717 | 5/1989 | United Kingdom | 74/594.6 |

*Primary Examiner*—Rodney H. Bonck
*Assistant Examiner*—Ryan W. Massey
*Attorney, Agent, or Firm*—Brown, Martin, Haller & McClain

[57] ABSTRACT

The cleat comprises laminated plates which attach to the shoe and retain a pair of springs which interact with the pedal to hold the pedal within a cavity in the cleat until release. In a first embodiment which is LOOK ™-compatible, four plates are used, the first of which levels out the mounting surface and the second which provides fore-and-aft adjustability. The third and fourth layers are the same as the two layers of the second embodiment, which is TIME ®-compatible. The third layer provides a cavity for receiving the upper portion of the pedal and channels wherein the retaining springs are located. Slots are provided in the third and fourth plates to permit side-to-side adjustment. The fourth plate caps off the cleat to protect the springs, and is made of a hard, durable material to prolong the life of the cleat. A third embodiment of the LOOK ™-compatible cleat combines the first and second layers into one layer.

21 Claims, 4 Drawing Sheets

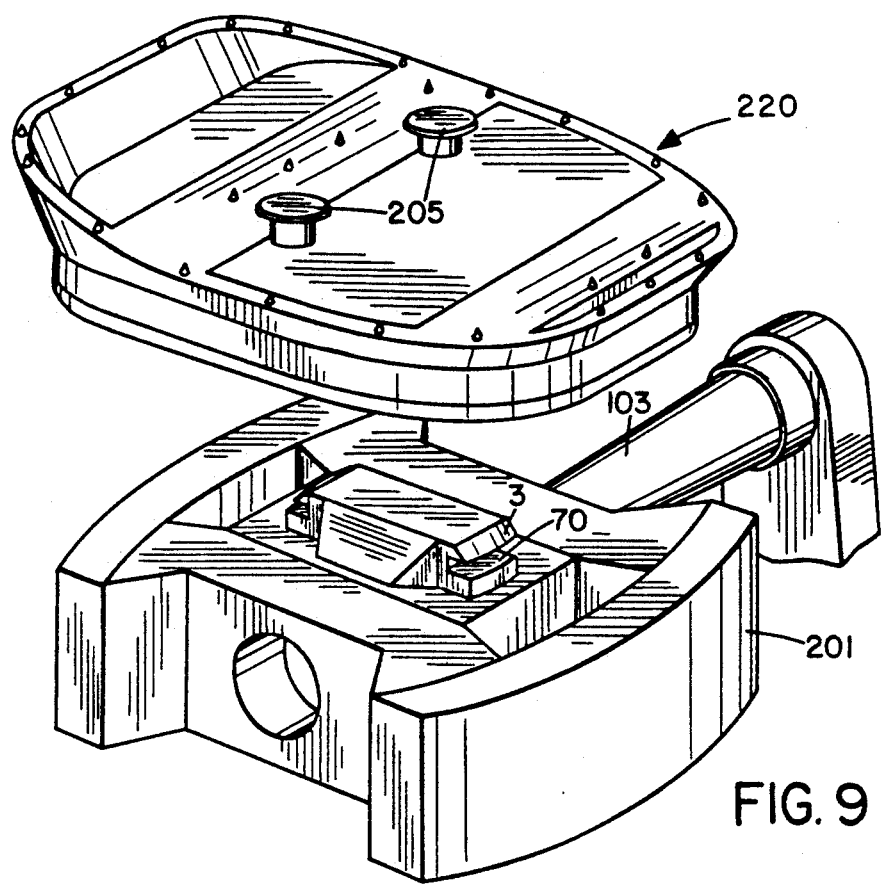
FIG. 9
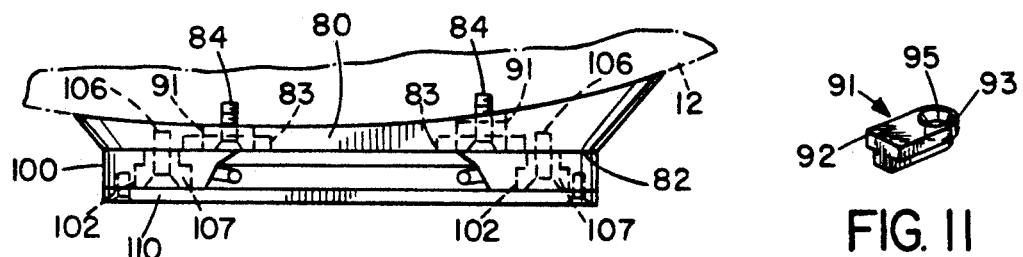
FIG. 10
FIG. 11
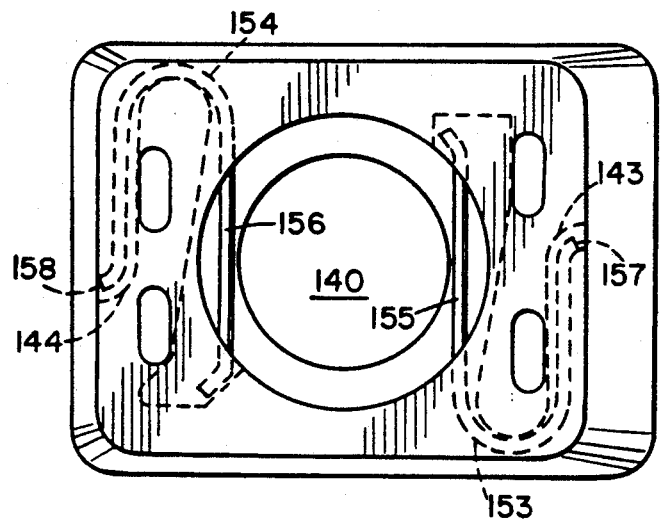
FIG. 12

5,213,009

CLEAT FOR CLIPLESS PEDALS

FIELD OF THE INVENTION

The invention herein relates to bicycle equipment and particularly to clipless bicycle pedals.

BACKGROUND OF THE INVENTION

Clipless pedal systems have received enthusiastic acceptance from bicycle racers, triathletes and more serious road bicycle riders. Recently, clipless pedals have also been introduced in a more durable form as equipment for mountain bicycles. The advantage of these pedal systems are that they replace the toe clip, which can be uncomfortable, and they are lighter and more aerodynamic.

The clipless pedal system disclosed in U.S. Pat. No. 4,942,778 provides a low-profile, ultra-light pedal system ideally suited for bicycle racing where weight is known to affect speed, as well as for recreational riding, including both road and mountain bikes, by providing a system in which the symmetrical pedal can be easily engaged and disengaged from the cleat. The system also offers the advantage of a flat exterior surface on the cleat to make walking easier when the rider leaves the bicycle.

The one- or two-piece cleat described in the '778 patent is designed to be LOOK TM -compatible, using the industry standard three-hole mounting pattern. Most LOOK TM -compatible systems utilize elongated mounting slots extending front-to-back to permit forward-to-back adjustment and slight skew of the cleat to match the individual rider's foot and knee rotation for comfort, and to optimize energy transfer from the foot to the pedal.

A second commonly known mounting system is that of the TIME ® system, which uses four screws. The TIME ® mounting system allows only front-to-back adjustment by way of grooves running front-to-back.

The existence of two standards means that there is no crossover between LOOK TM and TIME ® systems—there are no pedal systems which can be used with both. The industry has favored the LOOK TM, with more manufacturers providing LOOK TM compatibility in both their shoe and pedal designs.

The pedal system of the '778 patent is approximately half the weight of the lightest clipless systems currently available. For riders who are interested in incorporating the '778 system into their present equipment, it could become quite expensive if the shoes must be replaced along with the pedal system. Even if an existing pedal system is not being replaced, riders may prefer a particular shoe brand which might limit him or her to a certain pedal system.

It would be desirable to provide a cleat which will be compatible with both LOOK TM and TIME ® mounting patterns to permit all riders to have a wide range of adjustability of cleat location and to choose their preferred shoe brand and still be assured of compatibility with the clipless pedal of the '778 patent. It is to such a cleat that the present invention is directed.

SUMMARY OF THE INVENTION

It is an advantage of the present invention to provide a lightweight cleat for use with clipless pedals for racing, road, and mountain bikes.

It is another advantage of the present invention to provide a cleat which is compatible with all presently commercially available mounting patterns.

Yet another advantage of the present invention is to provide a cleat which is substantially thinner than other commercially available cleats providing improved cornering clearance while riding and making it easier to walk without difficulty and without damaging the cleat.

In an exemplary embodiment, the cleat comprises laminated plates which provide means for attaching the cleat to the shoe and means for retaining a pair of springs which interact with the pedal to hold the pedal within a cavity in the cleat until release. The pedal is released by turning the foot outward at an angle exceeding the angle resulting from normal leg rotation during pedalling. In a first embodiment which is LOOK TM -compatible, four plates are used, the first of which levels out the mounting surface for subsequent layers and the second which provides fore-and-aft adjustability. The third and fourth layers are the same as the two layers of the second embodiment, which is TIME ®-compatible as a result of the four-hole mounting pattern. The third layer (first layer of the TIME ®-compatible cleat) provides a cavity for receiving the upper portion of the pedal and channels wherein the retaining springs are located. Slots are provided in the third and fourth plates to permit side-to-side adjustment. The fourth plate caps off the cleat to protect the springs, and is made of a hard, durable material to prolong the life of the cleat. A gap extends into the cavity in the third and fourth layers to allow space for the spindle of the pedal, including sufficient room for the cleat to be rotated to disengage the pedal.

A third embodiment combines the first and second layers from above into a single layer and uses a washer in combination with each screw to hold this single layer to the sole of the shoe. The third and fourth layers remain as separate components.

BRIEF DESCRIPTION OF THE DRAWINGS

Understanding of the present invention will be facilitated by consideration of the following detailed description of the preferred embodiments of the present invention, taken in conjunction with the accompanying drawings, in which like reference numerals refer to like parts and in which:

FIG. 9 is a perspective view of a cleat and pedal system for a mountain bike (LOOK TM -compatible);

FIG. 10 is a side view of the cleat assembly of a third embodiment;

FIG. 11 is a perspective view of a washer for use with the cleat assembly; and

FIG. 12 is a top view of an alternate embodiment of the springs.

DESCRIPTION OF THE PREFERRED EMBODIMENTS

Figure 1:
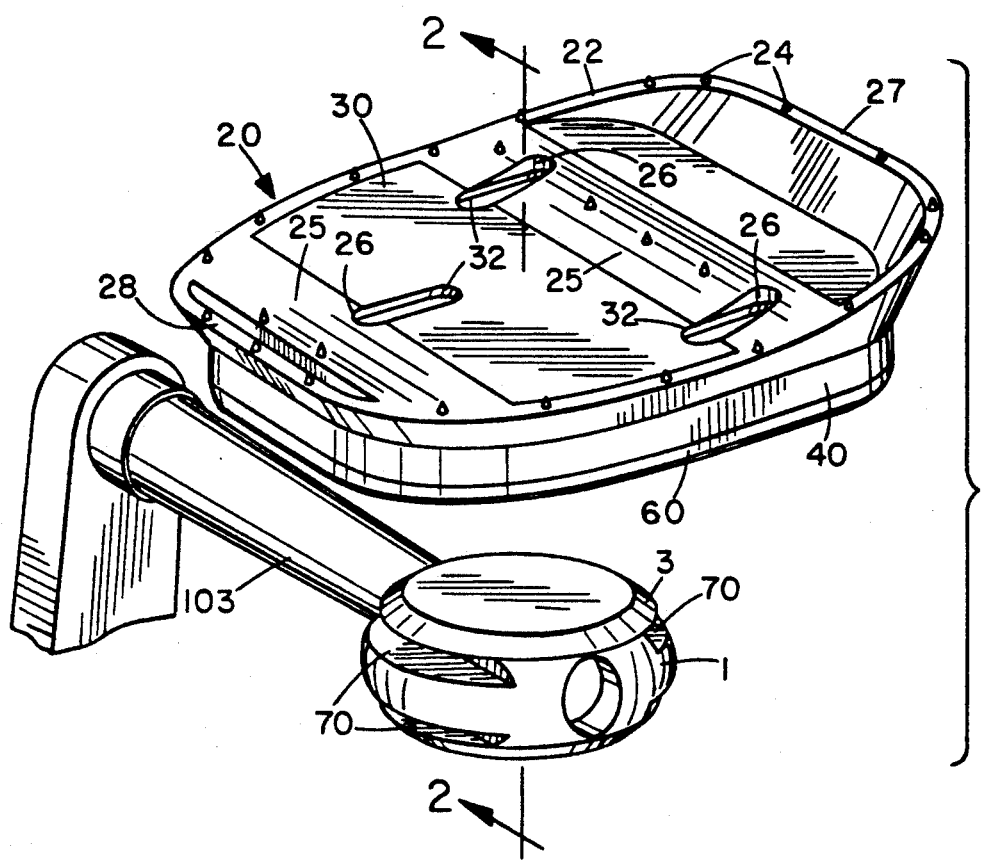
FIG. 1 is a perspective view of the cleat and pedal of the present invention.
Figure 2A:
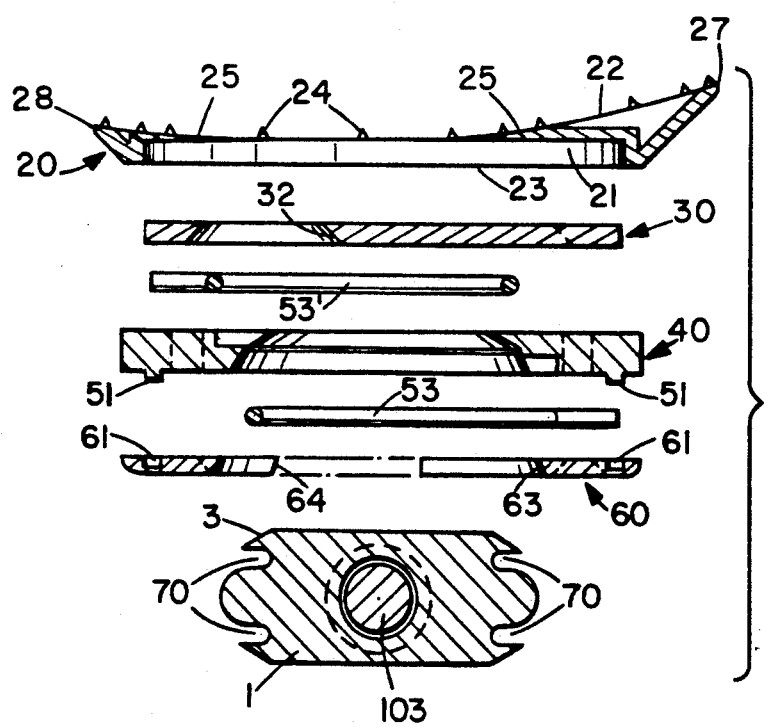
FIG. 2a is an exploded sectional view and FIG. 2b is an assembled view taken on line 2—2 of FIG. 1.
Figure 2B:
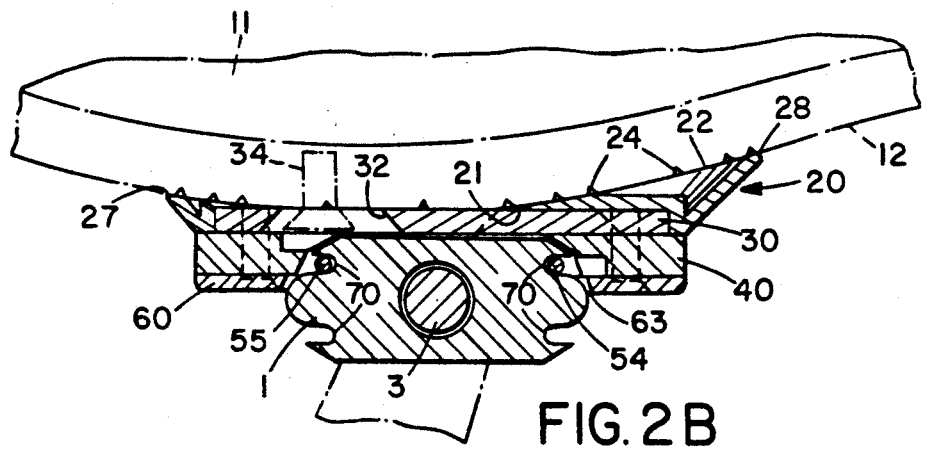

FIGS. 1 and 2 illustrate the interaction of the cleat 2 and pedal 1 where the springs 53 and 53' within cleat 2 are depressed when the pedal is initially inserted into the cavity 41, then resiles to fit into the grooves 70 of the generally-convex portion 3 of the pedal 1 to releasably hold the cleat and pedal together. The cleat 2 attaches to the sole 12 of the shoe 11, a cycling shoe which is pre-drilled with threaded holes for LOOK TM compatibility.

The exploded cleat shown in FIG. 2 provides the sequence in which the layers of the first embodiment are attached to the sole 12.

Figure 3:
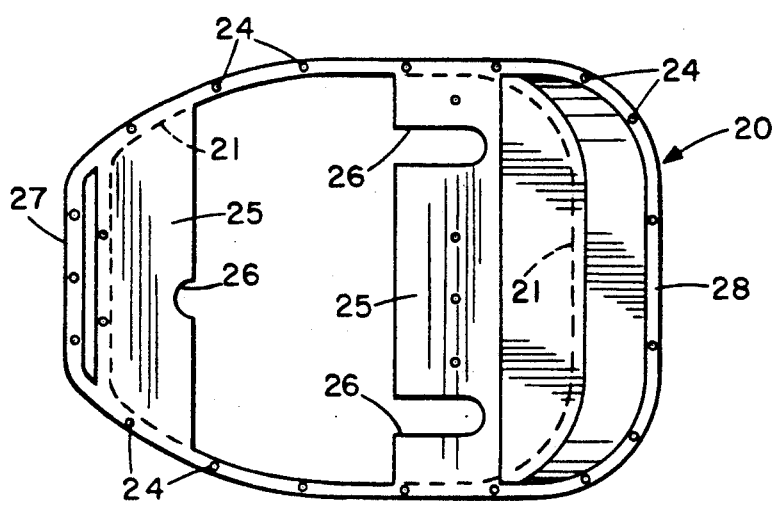
FIG. 3 is a top view of the first layer of the LOOK TM -compatible cleat.

The first layer 20 is shown in detail in FIG. 3. The upper portion 22 is wedge-shaped to match the curvature of the sole 12 in the area of the ball of the foot while the bottom portion 23 is flat and has a recessed area 21 so that the remaining layers of the cleat are attached to a flat surface. Teeth 24 extend from upper portion 22 to provide grip between the layer 20 and the sole 12. Notches 26 are located within straps 25 which span the width of the first layer 20 to correspond to the LOOK TM mounting holes to permit fasteners to be inserted without obstruction. The front edge 27 and rear edge 28 of layer 20 are tapered to facilitate walking on the cleat, allowing a rolling motion rather than awkward stepping which would be necessary to avoid the square edge of a cleat. Layer 20 can be made from, but is not limited to, plastic or other polymers which possess sufficient strength and rigidity to minimize any elasticity or flex response of the cleat to mechanical stress.

Figure 4:
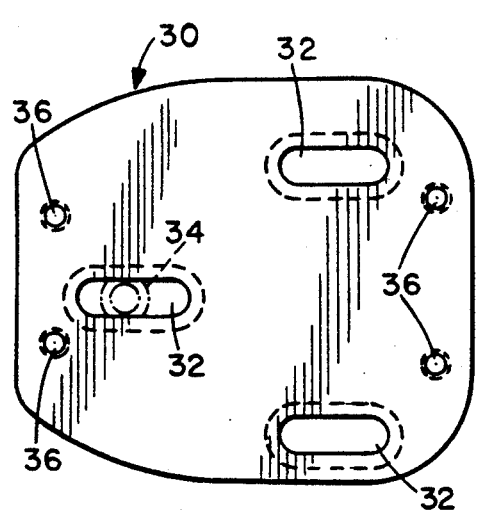
FIG. 4 is a top view of the second layer of the the LOOK TM -compatible cleat.

The second layer 30, illustrated in FIG. 4, conforms to the perimeter of the recessed area 21 of bottom portion 23 of layer 20 and fits within the recessed area 21. Three slots 32 are located to correspond to the LOOK TM mounting holes in sole 12, allowing forward and backward adjustment of the cleat to adjust to the rider's preference. Slots 32 are countersunk to allow screws 34 to be fully recessed within the slots 32 when tightened. Four threaded holes 36 are located in layer 30, the spacing of which corresponds to the TIME ® mounting pattern. Layer 30 is preferably kept as thin as practical, thus requiring a strong, rigid material. In the first embodiment, layer 30 is made of titanium, which is selected for its strength and light weight. Using titanium, the thickness need only be as thick as required to allow screws 34 to be fully recessed. Other materials may be used, such as hard plastics and polymers, stainless steel or other metals, but some weight and/or thickness may have to be sacrificed to assure sufficient strength.

Figure 5B:
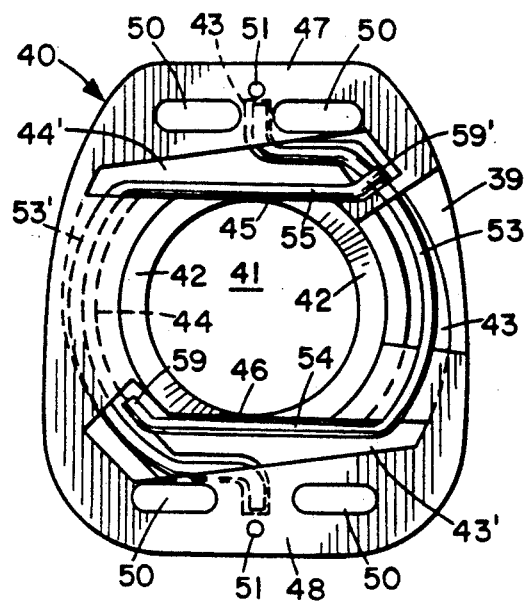
FIG. 5A and 5B is a top and a bottom view of the third layer of the LOOK TM -compatible cleat.
Figure 5A:
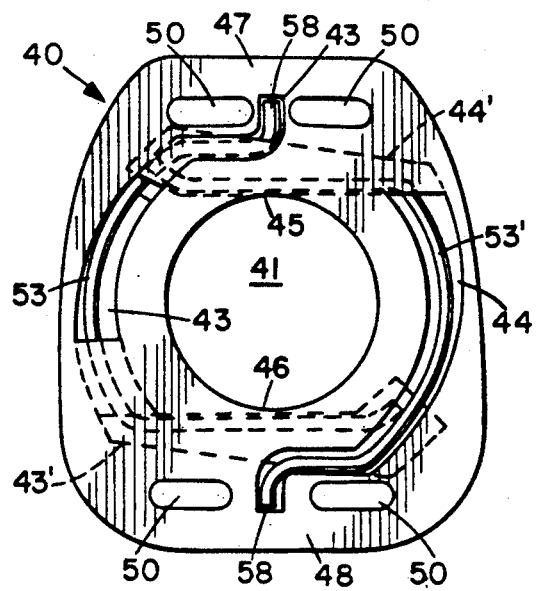

The third layer 40, illustrated in FIGS. 5a and b, has a perimeter which matches that of layer 30. FIG. 5a is a top view of layer 40 and FIG. 5b is a bottom view. At the center of the layer 40 is a cavity 41 in which the convex portion 3 of pedal 1 is held when the cleat 2 and pedal 1 are engaged. Cavity 41 is open through the full thickness of layer 40 so that the opening into which the pedal is inserted has its upper boundary at layer 30. Side walls 42 are tapered so that cavity 41 has a larger diameter at the bottom of layer 40 than at the top. This taper generally matches the contour of the convex portion 3 of pedal 1.

A gap 39 is located in the side of the layer 40 corresponding to the location of the spindle 103, so that spindle 103 does not interfere with insertion of pedal into cavity 41.

On the inner and outer sides of the cavity 41 (with the spindle side being the inner direction), arcuate channels 43 and 44 are formed to retain springs 53 and 53', respectively. The channels vary in depth to follow the profiles of the springs and terminate so that the springs exit into the cavity to form chords 55 and 54 across the front 45 and rear 46 of the cavity 41.

Channel 43 begins at the center of the front 47 of layer 40 and is grooved to a depth from the top side of the layer approximately one-half the thickness of layer 40. Channel 43 turns toward the outer side then follows the curvature of the cavity 41 with the radius of the curvature of the channel 43 being greater than the largest radius of the cavity 41. At a point of intersection of the curve and a line approximately tangent to the rearmost point of cavity 41 at its smallest radius, channel 43 turns toward the inner side of layer 40 while at the same time cutting through the thickness of layer 40 to continue as a channel grooved into the bottom side of layer 40 to a depth approximately one-half the thickness of layer 40. This segment 43' of channel 43 intrudes partially into the lower portion of the rear 46 of cavity 41. Channel 43 terminates with a short segment which turns from segment 43' to follow the curvature of cavity 41.

Channel 44 begins at the center of the back 48 of layer 40 and is an inverted mirror image of channel 43, proceeding along the inner side of the cavity 41 toward the front 47 where it cuts across the front 45 of cavity 41.

Figure 7A:
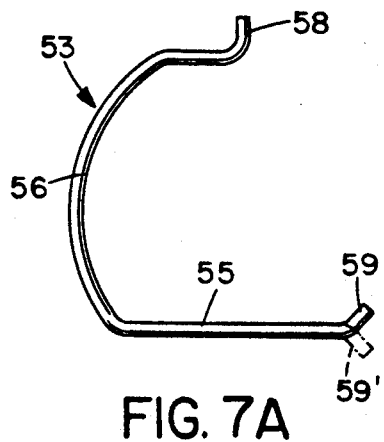
FIGS. 7A and 7B is a top and a side view of the springs for retaining the pedals in the cavity.
Figure 7B:
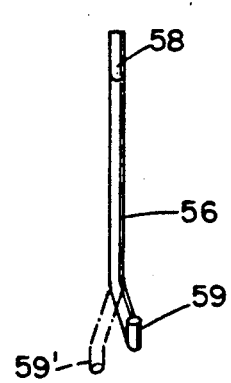

Spring 53, shown in FIGS. 7a and b, is formed from stainless steel or other resilient metal or material and is generally cylindrical in cross-section. The spring 53 is curved to sit down in and follow channel 43 as it follows the curvature of cavity 41. End 58 of spring 53 is an extension from the curved portion 56 which follows channel 43. End 58 anchors the front of spring 53 within layer 40. The spring is threaded from the top side of layer 40, FIG. 5a, to the bottom side, FIG. 5b, where it bends slightly upward to create chord 55 across cavity 41, then bends to form end 59 which anchors the back of the spring within layer 40.

Spring 53' is an inverted mirror image of spring 53 and is seated within channel 44 and anchored by ends 58 and 59' at the back and front, respectively. The extension of spring 53' into cavity 41 forms chord 54.

Springs 53 and 53' possess sufficient flexibility to allow chords 54 and 55 to compress toward the rear 46 and front 45 of cavity 41, respectively, when convex portion 3 of pedal 1 is initially inserted into cavity 41. As convex portion 3 is inserted further into cavity 41, chords 54 and 55 rebound into grooves 70 in the convex portion 3 so that the pedal 1 is retained in the cleat 2 by enough force to prevent its unintentional release under normal riding conditions. The springs should resist release when the greatest pull is applied, usually during takeoff from a stop or when climbing. Also, the springs must be sufficiently flexible to permit release from the pedal 1 when the rider's foot is rotated enough to depress the springs, removing them from the grooves.

In an alternate configuration the springs 153 and 154 are generally in a hairpin shape, as shown in FIG. 12. The outermost ends 157, 158 of each spring are anchored close to the front and rear edges, respectively of the layer. The innermost ends of the springs cut across cavity 140 to form chords 155 and 156. Channels 143 and 144 are appropriately formed to retain springs 153 and 154.

Referring again to FIGS. 5a and 5b, four slots 50 are located at the front 47 and rear 48 of layer 40 with the spacing which matches the TIME ® mounting pattern. The slots 50 run side-to-side to provide adjustment along the same lines. Two bosses 51 are formed in the front 47 and rear 46 which extend downward.

Figure 6:
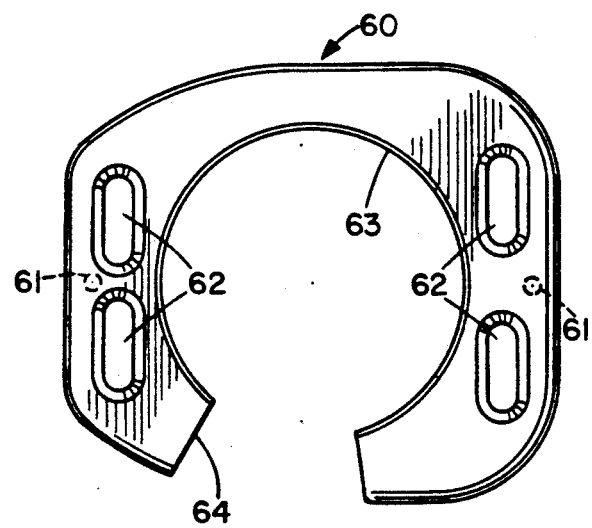
FIG. 6 is a bottom view of the fourth layer of the LOOK TM -compatible cleat, looking up toward the shoe sole.

Fourth layer 60, shown in detail in FIG. 6, provides protection for the openings and intricate elements of layer 40, protects and retains the springs 53 and 54, and holds layer 40 to layer 30 while permitting side-to-side variation in placement of the lower portion (pedal retaining portion layers 40 and 60) of the cleat. Two recesses 61 are provided to mate with bosses 51 to prevent slippage between layers 40 and 60. The four slots 62 are located per TIME ® specifications and are countersunk to permit the fastening screws to be fully recessed. Cavity 63 corresponds to cavity 41, and gap 64 corresponds to gap 39 of layer 40.

Layer 60 is a hard, damage-resistant surface. In the first embodiment, titanium or heat-treated aluminum is used for lightness and hardness. Materials including other metals, plastics and polymers may also be used with some weight gain or damage resistance loss.

Figure 8:
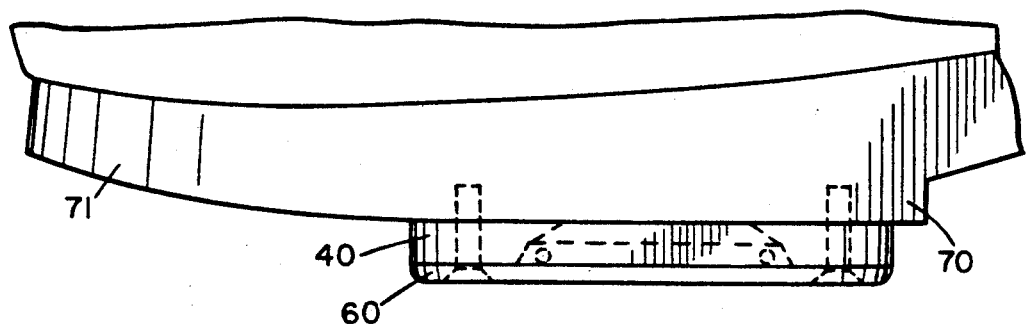
FIG. 8 is a side view of a TIME ®-compatible cleat mounted on a TIME ® shoe.

Shoes which are already equipped for TIME ® compatibility have a wedge 70 built into the sole 71 which levels out a substantial portion of the normal curvature of the sole resulting from the foot's curvature, as illustrated in FIG. 8. As stated above, the mounting pattern for TIME ®-compatible cleats includes four predrilled and threaded holes in the sole 71. Layers 40 and 60 fit directly to the sole 71 and are attached by way of the soles of four slots 50 and 62. A spacer or shim may be needed to provide additional contour matching between the flat layers 40 and 60 and the sole 71. The use of slots 50 and 62 rather than holes of the same spacing permits side-to-side adjustment of the cleat, which is not provided in a standard TIME ® cleat.

The retention means described herein, springs 53 and 53' or 153 and 154, are the preferred embodiment, but can be replaced with other retention means disclosed in the '778 patent. The spring-mounted tongue or bar can be substituted for springs 53 and 53' along with appropriate modifications to the channels which contain the retention means, as would be obvious from the cleat of the present invention in view of the '778 patent.

Cleat 220 illustrated in FIG. 9 is designed for use with mountain bike pedal 201. The pedal/cleat interaction is the same as the other embodiments; the difference lies in the fastening means between the cleat 220 and the shoe sole (not shown). Standard mountain bike shoes have two parallel slots in the sole within a recessed cavity. The fasteners 205 insert into these slots to hold the cleat in place. Due to the recessed nature of the sole, the cleat thickness is not as big a factor as for road bikes. The advantage here is the ability to use the pedal attachment function.

The third embodiment illustrated in FIG. 10 has the front-to-back adjustability of the first/second layer combination and the side-to-side adjustability of the third/fourth layer combination using three layers. Layer 80 is sloped on its upper portion 81 to follow the curvature of the sole 12 of the shoe. Its lower surface 82 is generally flat with three LOOK TM-compatible slots 83. Slots 83 are stepped, with a T-shaped cross-section, and receive washer 91 therein, through which screws 84 are inserted to fasten layer 80 to sole 12.

Washer 91, shown in FIG. 11, fits within each slot 83 so that its outer surface 92 is flush with lower surface 82 of layer 80. Washer 91 is elongated to cover approximately one-half the slot 83 length and is rounded on one end 93 to conform to the curvature of slot 83. Full front-back adjustability of layer 80 is enabled by reversing washer 91 so that its rounded end 93 coincides With the curved end of the slot 83 which is opposite the original location of washer 91 (turned 180° with respect to the front-to-back axis). A countersunk hole 95 is located near rounded end 93 into which screw 84 is inserted so that, when tightened, the screw head is fully recessed within hole 95.

Layer 80 is made from a plastic or polymer, either molded or machined, of sufficient strength to withstand the forces applied while cycling with little or no deformation, especially with respect to the attachment of the next layer.

Layer 100 attaches to layer 80 by way of TIME ®-compatible screw holes in lower surface 82 of layer 80. Springs are retained in layer 100 in the same manner as described for layer 40, or in the embodiment of FIG. 12, and a cavity is placed at its center to receive the pedal. Slots 102 permit side-to-side adjustability and are stepped as are slots 83 to receive washers 107, of the same configuration as washers 91. Screws 106 are fully recessed within slots 102.

Layer 110 is a lightweight metal such as titanium or aluminum which will tolerate being walked on without substantial damage.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A cleat for attachment to a sole of a bicycle shoe for use with a clipless bicycle pedal, said sole having a toe end and a heel end and a first plurality of bores having a spacing according to a first industry standard, said cleat comprising:

a first plate assembly having a perimeter generally conforming to a shape of at least a portion of said sole near said toe end, a generally ramp-like profile to follow a curvature of said portion of said sole, a first plurality of slots therein to be aligned with said first plurality of bores and a second plurality of bores having a spacing according to a second industry standard;

a first fastening means to be inserted through each slot of said first plurality to be received in each bore of said first plurality, said first fastening means being fully retained in said each slot of said first plurality;

a second plate assembly abutting said first plate assembly and having a cavity at its center, a perimeter corresponding to the perimeter of said first plate assembly, a second plurality of slots generally aligned with said second plurality of bores, and at least one channel adjacent to said cavity, said cavity having a diameter for receiving at least a portion of said clipless bicycle pedal;

at least one spring means to be retained in said at least one channel so that a portion of said at least one spring means extends into said cavity; and a second fastening means to be inserted through each slot of said second plurality of slots to be received in each bore of said second plurality of bore, said second fastening means being fully retained in said each slot of said second plurality;

wherein insertion of said at least a portion of said clipless pedal into said cavity causes said spring means to releasably retain said clipless bicycle pedal adjacent to said sole.

2. A cleat as in claim 1 wherein said first plurality of slots are aligned in a direction generally parallel to an axis running from said toe end to said end of said sole.

3. A cleat as in claim 1 wherein said second plurality of slots are aligned in a direction generally perpendicular to an axis running from said toe end to said heel end of said sole.

4. A cleat as in claim 1 wherein said first industry standard is LOOK TM-compatible.

5. A cleat as in claim 1 wherein said second industry standard is TIME ®-compatible.

6. A cleat as in claim 1 wherein said at least one channel is two channels disposed on opposite sides of said cavity and said at least one spring means is two spring means.

7. A cleat as in claim 1 wherein said second plate assembly comprises a spring retaining layer and a damage-resistant layer.

8. A cleat as in claim 1 wherein a first said portion of said at least one spring means extends across a front portion of said cavity and a second said portion of said at least one spring means extends across a rear portion of said cavity.

9. A cleat for attachment to a sole of a bicycle shoe for use with a clipless bicycle pedal, said sole having a toe end and a heel end and a first plurality of bores having a spacing according to a first industry standard, said cleat comprising:

a first plate having a perimeter generally conforming to a shape of at least a portion of said sole near said toe end, a generally ramp-like profile to follow a curvature of said portion of said sole, and a plurality of notches therein to be aligned with said first plurality of bores in said sole;

a second plate abutting said first plate and having a perimeter corresponding to the perimeter of said first plate, a first plurality of slots generally aligned with said plurality of notches in said first plate and said first plurality of bores, and a second plurality of bores apart from said first plurality of slots and having a spacing according to a second industry standard;

a first fastening means inserted through each slot of said first plurality and through each notch of said plurality to be received in each bore of said first plurality;

a third plate abutting said second plate and having a cavity at its center, a perimeter corresponding to the perimeter of said second plate, a second plurality of slots generally aligned with said second plurality of bores, and at least one channel adjacent to said cavity, said cavity having a diameter for receiving at least a portion of said clipless bicycle pedal;

at least one spring means to be retained in said at least one channel so that a portion of said at least one spring means extends into said cavity;

a fourth plate abutting said third plate and having a perimeter corresponding to the perimeter of said third plate, a third plurality of slots aligned with said second plurality of slots and an opening corresponding to said cavity; and a second fastening means inserted through each slot of said third plurality of slots and through each corresponding slot of said second plurality of slots to be received in each bore of said second plurality of bores;

wherein insertion of said at least a portion of said clipless pedal into said cavity causes said spring means to releasably retain said clipless bicycle pedal adjacent to said sole.

10. A cleat as in claim 9 wherein a combination of said first plate and said second plate is adjustable along a portion of an axis running from said toe end to said heel end.

11. A cleat as in claim 10 wherein said combination is adjustable at an angle to said axis.

12. A cleat as in claim 10 wherein said first industry standard is LOOK TM-compatible.

13. A cleat as in claim 9 wherein said second industry standard is TIME ®-compatible.

14. A cleat as in claim 9 wherein a combination of said third plate and said fourth plate is adjustable along a line perpendicular to an axis running from said toe end to said heel end.

15. A cleat as in claim 9 wherein said at least one channel is two channels disposed on opposite sides of said cavity and said at least one spring means is two spring means.

16. A cleat as in claim 9 wherein a first said portion of said at least one spring means extends across a front portion of said cavity and a second said portion of said at least one spring means extends across a rear portion of said cavity.

17. A cleat for attachment to a sole of a bicycle shoe for use with a clipless bicycle pedal, said sole having a toe end and a heel end and a plurality of bores having a spacing according to an industry standard and being generally flat at its lower surface, said cleat comprising:

a first plate having a cavity at its center, a first plurality of slots generally aligned with said plurality of bores and at least one channel adjacent to said cavity, said cavity having a diameter for receiving at least a portion of said clipless bicycle pedal;

at least one spring means to be retained in said at least one channel so that a portion of said at least one spring means extends into said cavity;

a second plate abutting said first plate and having a perimeter corresponding to the perimeter of said first plate, a second plurality of slots aligned with said first plurality of slots and an opening corresponding to said cavity; and a fastening means inserted through each slot of said second plurality and through each corresponding slot of said first plurality to be received in each bore of said plurality;

wherein insertion of said at least a portion of said clipless bicycle pedal into said cavity causes said spring means to releasably retain said clipless bicycle pedal adjacent to said sole.

18. A cleat as in claim 17 wherein said industry standard is TIME ®-compatible.

19. A cleat as in claim 17 wherein a combination of said first plate and said second plate is adjustable along a line perpendicular to an axis running from said toe end to said heel end.

20. A cleat as in claim 17 wherein said at least one channel is two channels disposed on opposite sides of said cavity and said at least one spring means is two spring means.

21. A cleat as in claim 17 wherein a first said portion of said at least one spring means extends across a front portion of said cavity and a second said portion of said at least one spring means extends across a rear portion of said cavity.

* * * * *